Patented Sept. 6, 1932

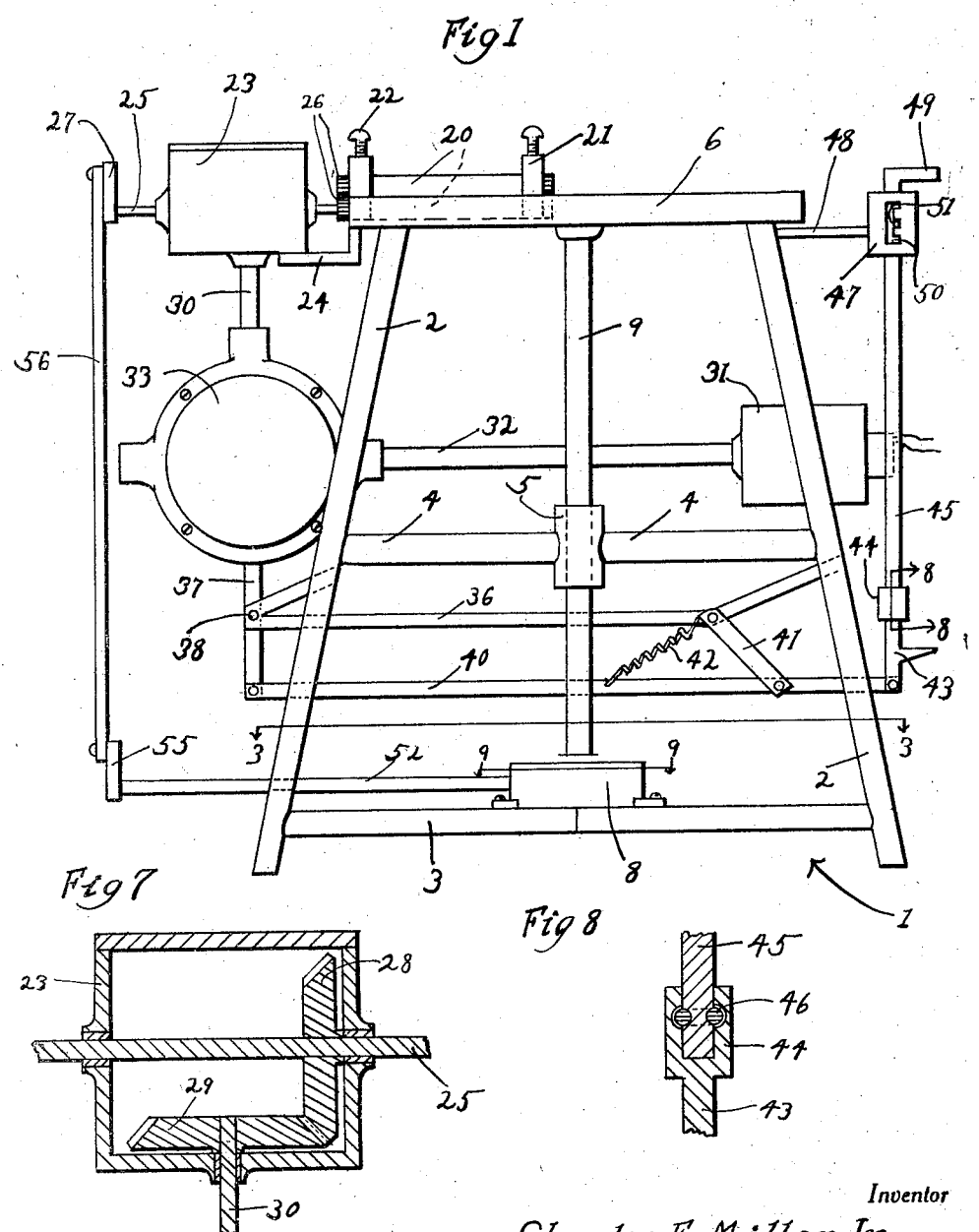

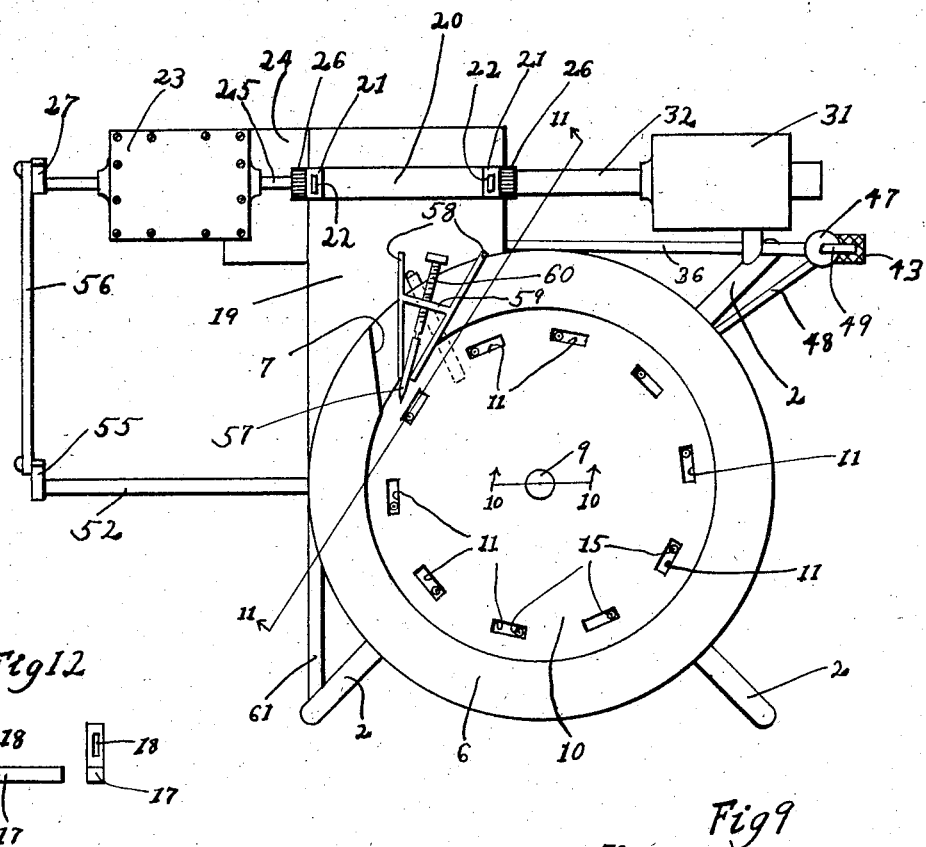

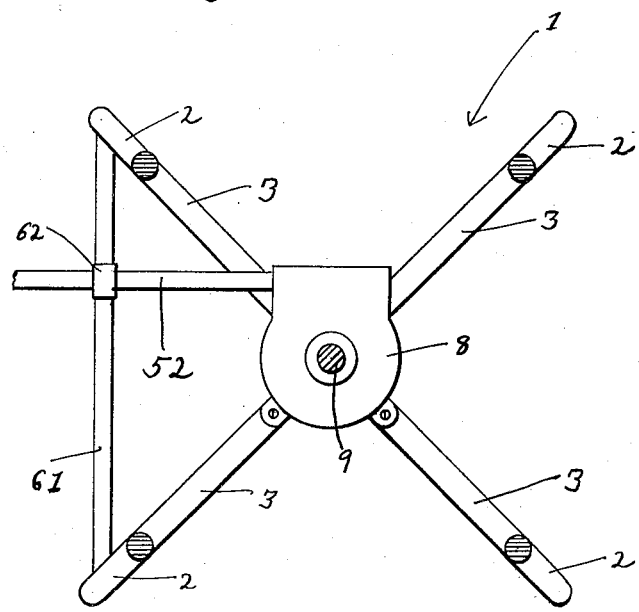
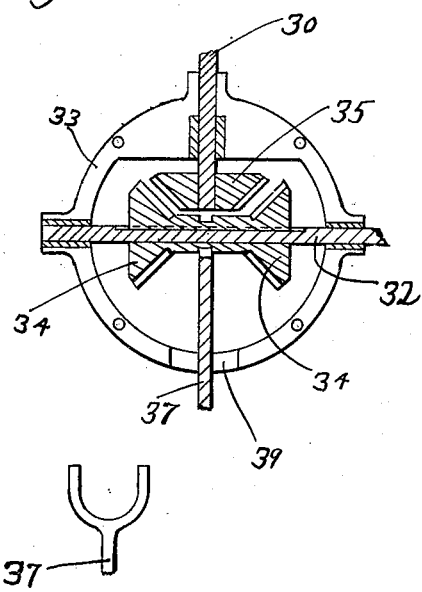
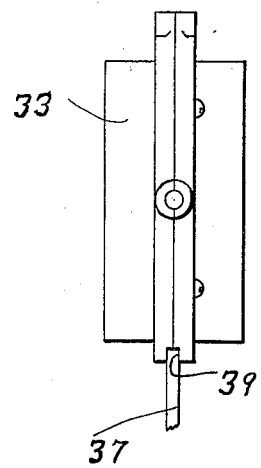

1,876,258

UNITED STATES PATENT OFFICE

CHARLES F. MILLER, JR., OF PITTSBURGH, PENNSYLVANIA

ANIMAL GUT DEFATTING MACHINE

Application filed November 22, 1930. Serial No. 497,493.

This invention relates to an animal gut defatting machine for use in abattoirs and the like and has for its primary object to provide, in a manner as set forth, a machine embodying a novel construction and arrangement of parts whereby the usual method of removing the fat by hand is eliminated.

Other objects of the invention are to provide a machine of the character described which will be simple in construction, thorough, durable, efficient in operation and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:

Figure 1 is a view in side elevation of a defatting machine constructed in accordance with this invention.

Figure 2 is a view in top plan of the machine.

Figure 3 is a horizontal sectional view taken substantially on the lines 3—3 of Figure 1.

Figure 4 is a detail view in front elevation of the transmission.

Figure 5 is a detail view in vertical longitudinal section through the transmission.

Figure 6 is a detail view of the gear-shifting yoke which is disposed in the transmission.

Figure 7 is a detail view in vertical longitudinal section through the gear housing in which the roll driving shaft is journaled.

Figure 8 is a detail view in vertical section taken substantially on the line 8—8 of Figure 1.

Figure 9 is a detail view in horizontal section taken substantially on the line 9—9 of Figure 1.

Figure 10 is a fragmentary detail view in vertical section taken substantially on the line 10—10 of Figure 2 looking in the direction indicated by the arrows.

Figure 11 is a sectional view taken substantially on the line 11—11 of Figure 2 looking in the direction indicated by the arrows.

Figure 12 is a view showing in side and end elevations the hook operating arm.

Referring to the drawings in detail, it will be seen that a supporting structure or stand is designated generally by the reference numeral 1 and comprises the outwardly diverging legs 2 which are connected adjacent their lower ends by the crossed braces or struts 3. The supporting structure of stand 1 further includes the arms 4 which radiate from a vertically disposed bearing 5, the purpose of which will be presently set forth. The outer ends of the arms 4 are connected with intermediate portions of the legs 2.

A stationary ring or annulus 6 is rigidly mounted on top of the supporting stand 2 and has formed therein a tangential recess or channel 7. A gear housing 8 is secured on the intersection of the braces or struts 3 and extending centrally thereinto is the vertically disposed rotatable shaft 9 which is journaled in the bearing 5. As is seen in Figures 2 and 10 of the drawings, a horizontally disposed turntable 10 is fixed in any suitable manner on the upper portion of the shaft 9 for rotation with said shaft. The periphery of the turntable 10 is closely adjacent the inner periphery of the ring or annulus 6, as best seen in Figure 11. The turntable 10 is provided, adjacent its periphery with a series of spaced, circumferentially extending, concentrically disposed slots 11 each having a shoulder 12 in one end thereof. Transverse pins 13 (see Figure 11) extend across each of the slots 11 and pivotally support the fat engaging hooks 14 which are operable in the slots 11. Each of the hooks 14 includes an upwardly directed pointed bill 15 which, when the hooks are in inoperative position, have their free ends disposed flush with or slightly below the upper surface of the turntable 10. Each of the hooks 14 is provided with a tail 16 for engagement with the shoulder 12 for limiting downward swinging movement of the hook. An angular bar 17 is provided with an upturned portion having a slot 18 therein for adjustable mounting on the outer periphery of the ring or annulus 6 at a point intermediate the side walls of the recess or channel 7. The arm 17 extends inwardly beneath the turntable 10 and is disposed in the path of the hooks 14 for swinging said hooks upwardly in the slots 11. As will be apparent, the portions of the bar or arm 17 may be adjusted vertically through the medium of the slot 18 whereby the movement of the hooks 14 may be regulated.

A horizontally disposed platform 19 is mounted on the supporting structure or stand 1 and has one end in abutting engagement with the outer periphery of the ring or annulus 6, said platform extending outwardly from the tangential recess or channel 7 in the ring or annulus 6, as clearly seen in Figure 2. A pair of coacting, superposed drawing rolls 20 are mounted in the standards 21 on the outer end portion of the platform 19. The upper roll may be adjusted in a conventional manner relative to the lower roll through the medium of the thumb screws 22. A gear housing 23 is supported on a bracket 24 or the like in longitudinal alinement with the drawing rolls 20 and journalled longitudinally through the housing 23 is a shaft 25 which is also journaled in the standards 21 and upon which the lower roll is fixed. The rolls 20 are operatively connected together by the gears 26. A crank 27 is fixed on the other end portion of the shaft 25. Also fixed on the shaft 25 within the housing 23 is a bevelled gear 28 which is in mesh with the horizontally disposed bevelled gear 29 fixed on the upper end portion of the vertically disposed shaft 30 which is journaled in the lower wall of the housing 23.

An electric motor 31 is mounted in any suitable manner on the supporting structure or stand 1 to actuate the horizontally disposed drive shaft 32 which extends rotatably through the transmission housing 33 also supported in any suitable manner on the supporting structure or stand 1. Spaced, opposed beveled gears 34 are splined for longitudinal movement on the drive shaft 32 in the housing 33 and are adapted for selective engagement with the beveled gear 35 which is fixed on the lower end portion of the vertical shaft 30 journaled in the housing 33. A bracket 36 is mounted on certain of the legs of the supporting structure or stand 1 and has one end disposed beneath the housing 33 as best seen in Figure 1 of the drawings. An operating yoke 37 is pivotally mounted, as at 38, on the bracket 36 and is operatively engaged at its upper end with the gears 34 in the housing 33. The operating yoke or lever 37 is operable in the slot 39 in the lower portion of the housing 33, as seen in Figure 5. A bar 40 is pivotally connected to the lower end of the operating yoke or lever 37 and has one end portion supported for swinging movement on the bracket 36 through the medium of the link 41. A coil spring 42 has one end connected to the bar 40 and its other end connected with the bracket 36 for yieldingly urging the bar 40 in a direction away from the operating yoke or lever 37. An upstanding foot pedal 43 is pivotally mounted on the end portion of the bar 40 which is remote from the operating yoke or lever 37 and, as just seen in Figures 1 and 8 of the drawings, the foot pedal 43 has formed integrally on its upper end a socket 44 for rotatably receiving the lower end portion of a vertically disposed keeper rod 45 which is rotatably anchored in the socket 44 by the locking ring 46. The upper end portion of the keeper rod 45 extends loosely through a sleeve 47 which is supported by the arm 48 on the supporting structure or stand 1. A handle or crank 49 is provided on the upper end of the keeper rod 45 for actuating same. A keeper slot 50 is provided in the sleeve 47 for coaction with the pin 51 which projects laterally from the rod 45.

Referring now to Figures 1, 3 and 9, it will be seen that a horizontally disposed shaft 52 extends rotatably into one side portion of the housing 8 and has fixed thereon a worm gear 53 which is in mesh with the gear 54 which, in turn, is fixed on the lower end portion of the turntable shaft 9. A crank 55 is fixed on the outer end portion of the shaft 52 and a pitman 56 operatively connects the crank 55 with the crank 27 on the shaft 25.

A fat removing knife, or blade 57 is adjustably mounted in the tangential recess or channel 7 of the ring or annulus 6 and projects inwardly over the turntable 10. As clearly seen in Figure 2, the knife or blade 57 is disposed tangentially in a guide which comprises a pair of converging side bars 58 which are connected together rigidly by the integral connecting bar 59 and between which side bars the blade or knife is located. An adjusting screw 60 is threaded through the connecting bar 59 and is to be engaged with the knife or blade 57 for adjusting it and holding it in adjusted position.

The casing to be pulled and defatted is placed on the turntable 10 and subsequently passed against the knife and between the rolls 20. The electric motor 31 drives the rolls 20 through the shafts 32, 30 and 25 and the various gears which operatively connect the shafts with each other. The gut or casing is drawn by the rolls from the turntable 10 through the tangential recess or channel 7, over the platform 19, and between the rolls 20 from which the gut is released in any suitable receptacle. The turntable 10 is rotated in a horizontal plane in a clockwise direction by the shaft 25 through the crank 27, the pitman 56, the crank 55, the shaft 52, the shaft 9, and the gears which operatively connect the shafts 9 and 52 together. As the turntable 10 revolves the hooks 14 are successively engaged by the arm 17 and are swung upwardly through the slots 11 immediately after passing the cutting edge of the knife or blade 57. The points 15 of the hooks 14 are thereby engaged in the fat of the casing and said fat is torn from the guts or casing. As the gut is drawn out through the recess or channel 7 it is engaged against the knife or blade 57 and is thereby further cleaned. As will be apparent, after the hooks 14 pass the bar or arm 17, said hooks will drop by gravity so that the points 15 thereof will rest within the slots 11, as seen in Figure 11.

As will be apparent, the direction of movement of the machine may be reversed if desired through the medium of the gears in the housing 33, the yoke or operating lever 37, the bar 40, the foot pedal 43, and the keeper rod 45. It will also be readily apparent that the machine may be rendered inoperative by disengaging both of the gears 34 from the gear 35 in the manner illustrated in Figure 5 of the drawings.

Referring to Figures 2 and 3 of the drawings, it will be seen that a horizontally disposed bar 61 extends between certain of the legs 2 of the supporting structure or stand 1 and has mounted on its intermediate portion thereof a suitable bearing 62 for rotatably supporting the shaft 52.

It is believed that the many advantages of an animal gut defatting machine constructed in accordance with this invention will be readily understood, and although the preferred embodiment of the invention is as illustrated and described, it is to be understood that changes in the details of construction may be had which will fall within the scope of the invention as claimed.

What is claimed is:

1. A gut defatting machine comprising a supporting stand, a stationary ring mounted on the supporting stand, a turntable mounted for rotation in the ring for receiving the gut, the ring extending above the turntable, coacting rolls operatively mounted adjacent the turntable for drawing the gut therefrom, a knife mounted on the ring adjacent the turntable for engagement with the gut for removing fat therefrom as said gut is drawn from the turntable, means on the turntable engageable with the gut for removing fat from said gut and for engaging the gut with the knife as the gut is drawn from the turntable, and a prime mover mounted on the stand and operatively connected with the rolls and with the turntable.

2. A gut defatting machine comprising a supporting stand, a horizontally disposed, stationary ring mounted on the supporting stand, said ring being provided with a recess in its upper side extending from its inner to its outer periphery, a turntable operatively mounted on the supporting stand within the ring for receiving the gut, the ring extending above the horizontal plane of the turntable, a horizontally disposed platform mounted on the supporting stand and extending outwardly from the ring, a pair of coacting drawing rolls mounted on the platform adjacent the ring, said rolls constituting means for drawing the gut from the turntable through the channel in the ring, a knife adjustably mounted in the channel of the ring and extending therefrom over the marginal portion of the turntable, said knife engageable with the gut as the gut is drawn from the turntable in a manner to remove fat from the gut, and means mounted on the turntable for engagement with the gut in a manner to remove fat therefrom and to engage the gut with the knife as said gut is drawn from the turntable.

3. A gut defatting machine comprising a supporting stand, a turntable operatively mounted on the stand for receiving the gut, means adjacent the turntable for drawing the gut from said turntable, said turntable having a series of slots, a gut engaging hook mounted for swinging movement in each of the slots for periodic engagement with the gut on the turntable in a manner to remove fat therefrom as the gut is drawn from the turntable, and means mounted adjacent the turntable and engageable successively with the hooks for shifting said hooks to gut engaging position.

4. A gut defatting machine comprising a supporting stand, a turntable operatively mounted on the stand for receiving the gut, coacting rolls operatively mounted adjacent the turntable for drawing the gut from the turntable, said turntable being provided with a series of spaced, concentrically arranged slots, a gut engaging hook mounted for swinging movement in each of the slots for periodic engagement with the gut on the turntable in a manner to remove fat therefrom as the gut is drawn from the turntable, means mounted adjacent the turntable and engageable successively with the hooks for shifting said hooks to gut engaging position, coacting means on the hooks and the turntable for limiting the swinging movement of the hooks by gravity, a prime mover mounted on the stand, and means operatively connecting the prime mover with the rolls and with the turntable.

In testimony whereof I affix my signature.

CHARLES F. MILLER, Jr.